(12) United States Patent
Lang et al.

(10) Patent No.: US 8,425,783 B2
(45) Date of Patent: *Apr. 23, 2013

(54) SYSTEM AND METHOD THAT REMOVES CONTAMINANTS FROM SULFUR

(75) Inventors: Leslie L. Lang, Calgary (CA); Paul R. Larson, Calgary (CA); John A. MacDonald, Calgary (CA)

(73) Assignee: Brimrock International Inc., Kilgore, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,654

(22) Filed: Apr. 4, 2011

(65) Prior Publication Data

US 2011/0271490 A1    Nov. 10, 2011

Related U.S. Application Data

(63) Continuation of application No. 12/079,551, filed on Mar. 27, 2008, now Pat. No. 7,918,994.

(51) Int. Cl.
*C01B 17/02* (2006.01)

(52) U.S. Cl.
USPC ......... 210/742; 23/293 S; 23/308 S; 210/774; 423/578.1; 423/578.4

(58) Field of Classification Search .............. 210/85, 210/86, 103, 104, 137, 143, 149, 181, 182, 210/184, 241, 258, 259, 294, 295, 323.1, 210/335, 513, 522, 739, 742, 743, 774, 806, 210/808; 23/295 R, 295 S, 306, 308 R, 308 S, 23/293 S; 423/567.1, 578.1, 578.2, 578.4; 700/108, 266, 271, 273, 299
See application file for complete search history.

(56) References Cited

U.S. PATENT DOCUMENTS

| | | | | |
|---|---|---|---|---|
| 1,331,646 A | * | 2/1920 | Hood | 423/578.1 |
| 1,970,147 A | * | 8/1934 | Levy | 423/578.1 |
| 2,056,929 A | * | 10/1936 | Moore | 423/198 |
| 2,169,261 A | * | 8/1939 | Lee et al. | 423/578.1 |
| 2,402,553 A | * | 6/1946 | Hurt et al. | 422/119 |
| 2,622,007 A | * | 12/1952 | Allen, Jr. | 423/543 |
| 2,731,332 A | * | 1/1956 | Ackert et al. | 23/308 S |
| 2,796,325 A | * | 6/1957 | Bertozzi | 423/519.2 |
| 2,847,201 A | * | 8/1958 | Ebarb, Sr. | 299/6 |
| 4,518,577 A | * | 5/1985 | Klecka | 423/576.2 |
| 4,705,676 A | * | 11/1987 | Fong et al. | 423/578.4 |
| 4,816,225 A | * | 3/1989 | Mathur et al. | 422/262 |
| 5,096,571 A | * | 3/1992 | Womack et al. | 209/164 |
| 5,122,351 A | * | 6/1992 | Hardison | 423/220 |
| 5,470,459 A | * | 11/1995 | Barrington et al. | 210/149 |
| 5,711,929 A | * | 1/1998 | Chalkley et al. | 423/567.1 |
| 5,861,099 A | * | 1/1999 | Hartmann | 210/710 |
| 7,918,994 B2 | * | 4/2011 | Lang et al. | 210/86 |
| 2009/0149981 A1 | * | 6/2009 | Evans et al. | 700/110 |

* cited by examiner

*Primary Examiner* — Joseph Drodge
(74) *Attorney, Agent, or Firm* — Strasburger & Price, LLP

(57) ABSTRACT

A system and method for removing contaminant from sulfur (or sulphur) to a level that allows re-processed sulfur to reenter a supply chain. The system and method melt contaminated sulfur, filters the molten sulfur, and then dispenses the less contaminated sulfur after filtering it. More specifically, solid contaminated sulfur enters a settling tank, while heated molten sulfur circulates through the system and the settling tank. The circulation of the molten sulfur assists in the melting process of the solid sulfur, allowing the solid sulfur to melt efficiently. In preferred embodiments of the system, the system uses steam jacked sulfur lines and steam tracing to maintain temperatures for melting the solid sulfur and maintaining the molten state of the sulfur circulating through the system. Furthermore, the system comprises a programmable logic controller, which controls motors, pumps, valves, and environment monitoring instruments.

16 Claims, 2 Drawing Sheets

SYSTEM AND METHOD THAT REMOVES CONTAMINANTS FROM SULFUR

CROSS-REFERENCE TO RELATED APPLICATIONS

This application claims the benefit of U.S. Non-Provisional application Ser. No. 12/079,551 filed on Mar. 27, 2008, which application is hereby incorporated by reference for all purposes in its entirety.

STATEMENT REGARDING FEDERALLY SPONSORED RESEARCH OR DEVELOPMENT

N/A

REFERENCE TO MICROFICHE APPENDIX

N/A

BACKGROUND OF THE INVENTION

1. Field of the Invention

The present invention is directed to an apparatus and method for effectively and efficiently removing contaminants from sulfur (or sulphur).

2. Description of the Related Art

Refineries and gas processing plants that produce sulfur also produce contaminated sulfur. The contaminated sulfur produced by the plants is becoming a worldwide environmental concern.

To deal with the contaminated sulfur many producers of sulfur employ regional waste management companies to remove contaminated sulfur from their sites. The waste management companies commonly remove and process the contaminated sulfur through waste management landfills. While effective, using waste management landfills has high costs, monetarily and to the local environment.

The waste management landfills, usually involve transporting the contaminated sulfur to the landfill, preparing a limestone sub-base, unloading the contaminated sulfur, layering the disposed sulfur with an impermeable lining, capping the sulfur with landfill, and then monitoring the landfill for acidic groundwater contamination. The responsibility for monitoring the landfill is an ongoing process, and is a great expense for all liable parties.

There are no known companies or organizations in the sulfur industry or waste processing industry at the time of filing the present application that provide an efficient method or system for removing contaminants from processed sulfur to a degree that allows the sulfur to reenter the supply chain instead of being disposed of in a landfill.

SUMMARY

Described in the current application is a system for removing contaminant from sulfur to a level that allows the once contaminated sulfur to reenter the supply chain. In general, reclaimed solid sulfur enters a melting and settling tank, while heated molten sulfur circulates through the tank. The circulation of the molten sulfur assists the melting of the solid sulfur.

In preferred embodiments of the system, the system uses steam jacked sulfur lines and steam tracing to maintain temperature of the molten sulfur. In addition, in preferred embodiments of the system, plate coils are installed on the outside of the tank, rather than traditional steam pipe coils that are installed on the inside of tanks and immersed in the molten sulfur.

In addition, the system comprises a programmable logic controller and the programmable logic controller controls the operation of motors, variable frequency drives, pneumatic control valves, and monitoring instruments. In preferred embodiments of the system, the controller controls eight electric motors, five variable frequency drives, one pneumatic control valve (proximate to the heat exchanger), and monitoring instruments. The electrical supply voltage will vary from location to location; usually the voltages are six hundred volts (600V), four hundred and eighty volts (480V), or three hundred and sixty volts (360V).

In preferred embodiments of the system, each motor will be powered by the voltage available at a given location.

In preferred embodiments of the system, the system has a twenty-five ton per hour production capacity, with up to two percent moisture and five percent contaminate levels in the feed material.

The system is versatile and compact. In preferred embodiments of the system, components of the system are skid mounted, allowing for easy transport of the system. In preferred embodiments of the system, two skids are of the same dimensions as a forty-foot container. In addition, a container holds the feed hopper and conveyor.

In preferred embodiments of the system, the two skids do not fit inside a container as the skid envelope conforms to the outside dimensions of a container.

BRIEF DESCRIPTION OF THE DRAWINGS

Below is a description of example embodiments of a system for removing contaminant from sulfur to a level that allows the sulfur to enter a supply chain, in conjunction with appended drawings, wherein like reference numerals refer to like elements in figures, and wherein.

DETAILED DESCRIPTION

Figure 1:
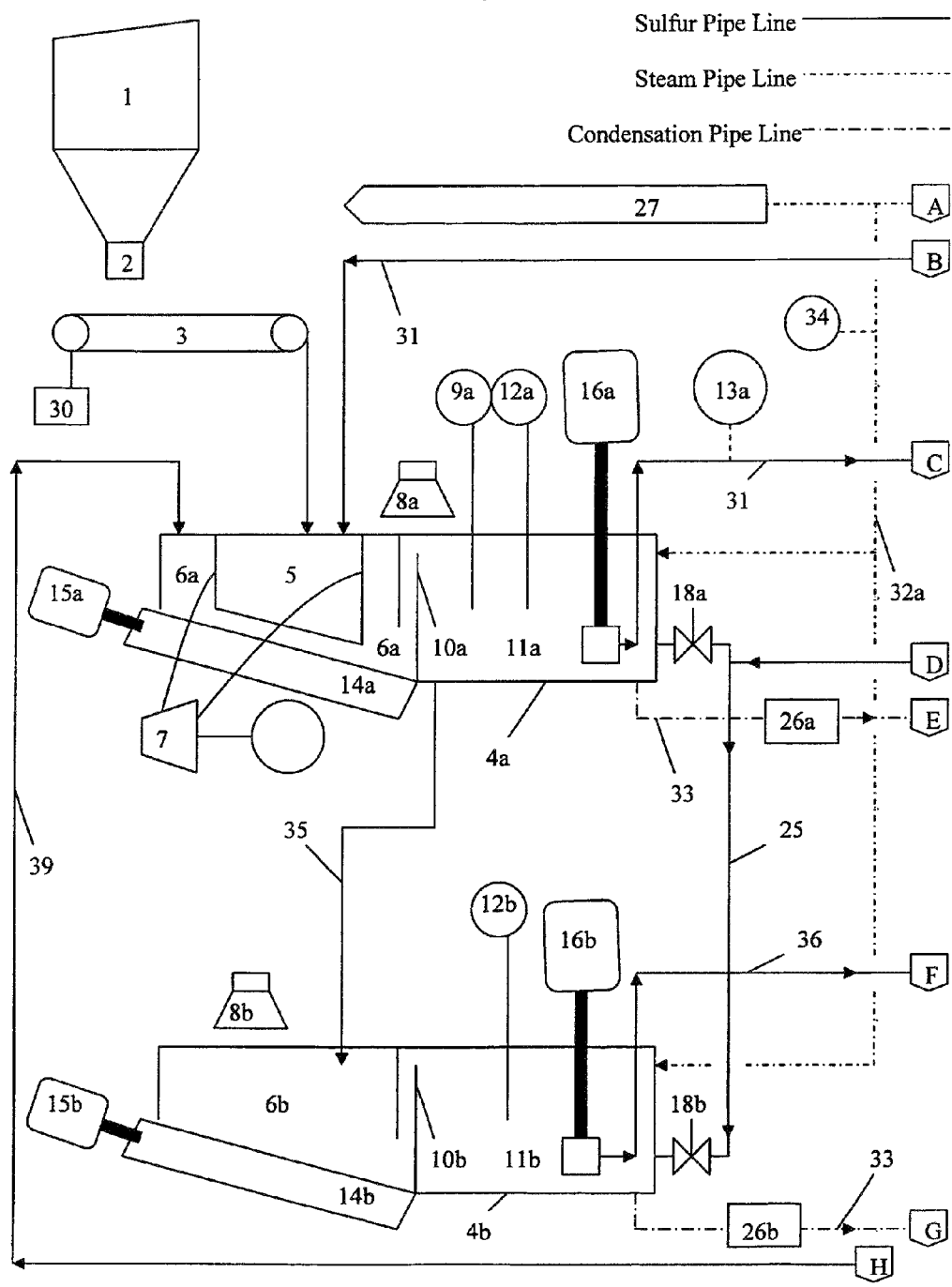
FIG. 1 is a diagram of a preferred embodiment of the system demonstrating a flow of molten sulfur, steam, and condensation that allows solid contaminated sulfur to convert into molten sulfur for filtering to a state that allows the sulfur to enter a supply chain.
Figure 2:
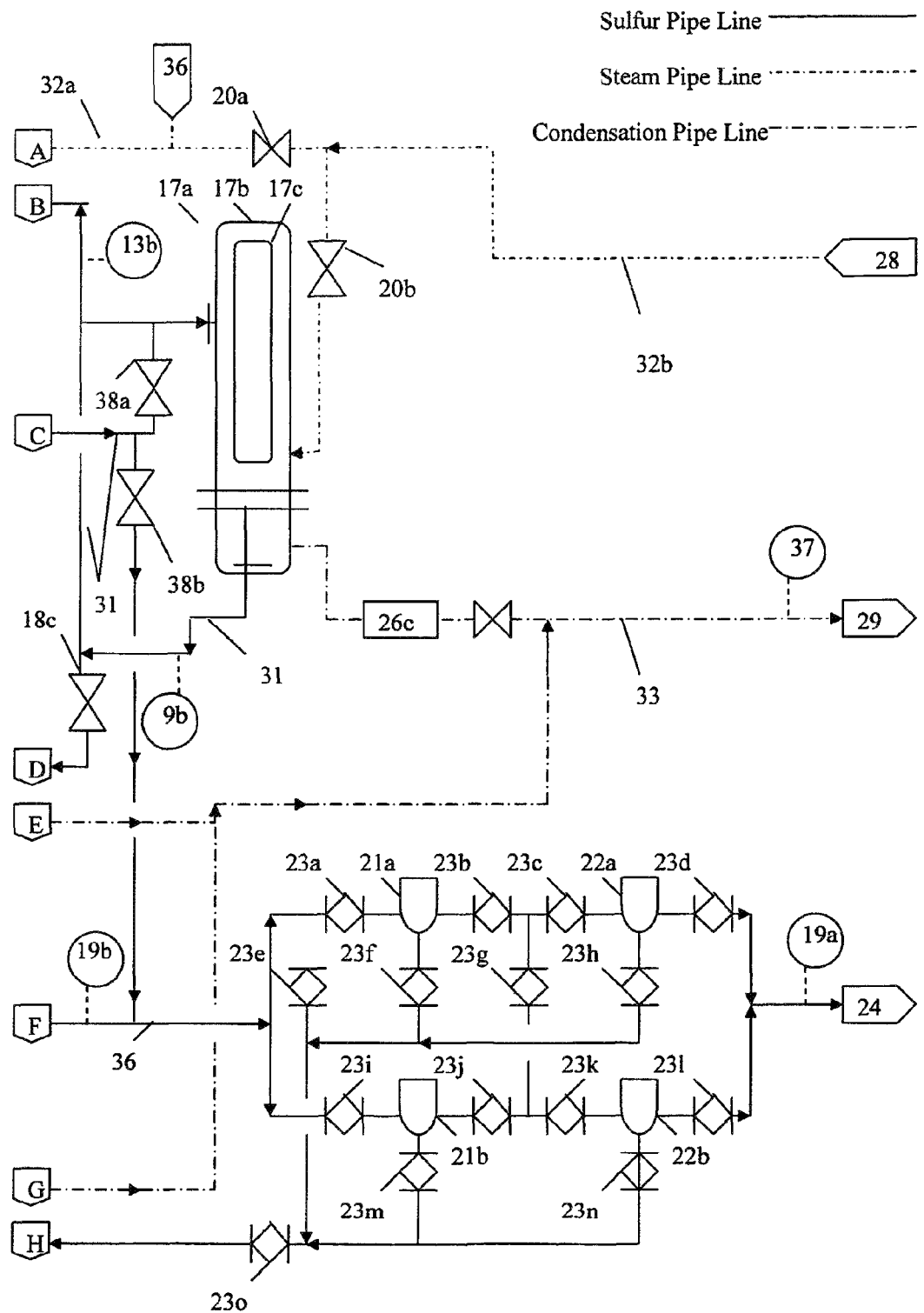
FIG. 2 is a continuation of FIG. 1, where place markers A, B, C, D, E, F, G, and H of figure two link respectively to place markers A, B, C, D, E, F, G, and H of FIG. 1.

The present specification explains preferred embodiments of a system for removing contaminant from sulfur to a level that allows the sulfur to enter a supply chain. The present detailed description does not limit the system and the system may embody various forms. Furthermore, FIG. 1 and FIG. 2 illustrate a preferred embodiment of the system, and the figures are merely devices for assisting the explanation of the present detailed description and do not limit the scope of the system.

In general, solid sulfur enters a melting and settling tank 4a, while molten sulfur circulates through the tank 4a and the system via sulfur pipelines 31 & 39. In FIG. and FIG. 2, sulfur pipelines 31 & 39 are represented by solid lines. The circulation of the molten sulfur assists the melting of the solid sulfur.

In preferred embodiments of the system, the system uses steam jacked sulfur lines and steam tracing to maintain an optimal temperature for piping and purifying sulfur.

In preferred embodiments of the system, a steam source 28 introduces steam into the system. The steam travels throughout the system via steam pipelines 32a & 32b and steam jacked sulfur pipelines. In FIG. 1 and FIG. 2, steam pipelines (including the steam pipelines 32a & 32b) are represented by lines that comprise dots and short dashes.

In FIG. 2, a pressure-reducing valve 20a reduces steam pressure from the steam pipeline 32b. The steam in the steam pipeline 32a, in figure one, is at a lower pressure for steam tracing. The high rate of sulfur flowing through the heat exchanger 17a allows for steam of higher pressure (8 bars) to travel through the pipes. For the steam tracing downstream of the pressure-reducing valve 20a, the valve reduces the pressure of the steam to three bars (3 bars).

The high steam pressure in the heat exchanger is a novel feature. Other sulfur melting systems rely on steam coils, which are limited in that they must contain a lower steam pressure to avoid overheating sulfur.

As previously mentioned, steam pressure of the steam pipelines 32a & 32b varies. The pressure-reducing valve 20a reduces the steam pressure of pipeline 32b, so that the steam pressure in pipeline 32a is lower. The flow of sulfur through the heat exchanger allows the steam to transfer heat at a higher pressure than the steam that transfers down stream of the pressure-reducing valve 20a. Specifically, in preferred embodiments of the system, the steam pressure prior to being down stream of the pressure-reducing valve 20a may be as high as eight bars. Near the pressure-reducing valve is a Pressure Safety Valve (PSV) 36, which vents steam in the event of over pressure. A line 27 provides steam for steam tracing sulfur lines.

In FIG. 1 and FIG. 2, steam pipelines are represented by lines that comprise dots and short dashes. In addition to steam and sulfur pipelines, preferred embodiments of the system comprise steam traps 26a, 26b, and 26c and condensation pipelines 33 that allow condensation to escape the system. The condensation finally leaves the system via condensation outlet 29. A pressure gauge 37 monitors condensate pressure exiting the system.

In addition, the system comprises a programmable logic controller and the programmable logic controller controls the operation of motors, variable frequency drives, pneumatic control valves, and monitoring instruments. In preferred embodiments of the system, the controller controls eight electric motors, five variable frequency drives, one pneumatic control valve 20b, and monitoring instruments. The electrical supply voltage will vary from location to location; usually the voltages are six hundred volts (600V), four hundred and eighty volts (480V), or three hundred and sixty volts (360V).

In preferred embodiments of the system, each motor will be powered by the voltage available at a given location. As shown in FIG. 1, the system comprises a sulfur feed bin 1.

In preferred embodiments of the system, the sulfur feed bin comprises: a volume of approximately seven cubic meters; a height of approximately two and two-tenths meters (2.2 m), length of four and one tenth meters (4.1 m), and a width of two and four tenths meters (2.4 m); a normal operating temperature range of negative thirty degrees to plus 50 degrees Celsius, and a design temperature of negative fifty degrees Celsius; at a typical atmospheric pressure; and a composition of carbon or stainless steel (i.e. SS304L) or both carbon and stainless steel.

Contaminated sulfur is introduced to the system by dumping the sulfur into the sulfur feed bin 1. Moreover, the contaminated sulfur may be crushed in the sulfur feed bin 1.

In preferred embodiments of the system, a grizzly will cover an inlet of the sulfur feed bin in order to keep out larger extraneous materials, such as wood and large rocks.

The sulfur feed bin includes a discharge chute 2. In FIG. 2, the discharge chute 2 connects to the sulfur feed bin 1 at the bottom of the bin 1. However, in other embodiments of the system the discharge chute lies in other areas of the bin.

The system further comprises a sulfur feed conveyor. In preferred embodiments of the system, the sulfur feed conveyor comprises: a flow rate of approximately twenty-nine thousand five hundred and forty-eight kilograms per hour (29,548 kg/h); and an angle of approximately fifteen degrees.

In preferred embodiments of the system, the sulfur feed conveyor is not jacketed.

In FIG. 1, the sulfur feed conveyor 3 lays under the sulfur feed bin 1. In preferred embodiments of the system, the feed conveyor should lay beneath the discharge chute.

In preferred embodiments of the system, a programmable controller controls the sulfur feed conveyor 3 and other mechanical devices of the system.

Upon discharge of the contaminated sulfur via the discharge chute 2, the sulfur feed conveyor 3 transports the discharged contaminated sulfur to the melting and settling tank 4a.

In preferred embodiments of the system, the melting and settling tank comprises three compartments: a melting compartment, a settling compartment, and a pump compartment. In figure one, the melting and settling compartment 6a is a continuous compartment; however, in other preferred embodiments of the system, the melting and settling compartments are less continuous.

In one preferred embodiment of the system, the melting compartment, the settling compartment, and the pump compartment comprise respectively a volume of two and four-tenths cubic meters (2.4 m$^3$), six and nine-tenths cubic meters (6.9 m$^3$), and two and nine-tenths cubic meters (2.9 m$^3$).

In preferred embodiments of the system, the overall dimensions of the melting and settling tank are five meters (5 m) in length, two and three tenths meters (2.3 m) in width, and two and eight tenths meters (2.8 m) in height. In addition, preferred embodiments of the system have an overall operating/design temperature approximately between one hundred and twenty-five degrees Celsius and one hundred and seventy-five degrees Celsius. The overall operating/design pressure is that of usual atmospheric pressures.

In preferred embodiments of the system, the overall structure of the melting and settling tank 4a is carbon, stainless steel, or a combination of carbon and stainless steel. In FIG. 1, a conveyor motor 30 attaches to the feed conveyor 3. The conveyor motor 30 drives the feed conveyor 3. The motor of the conveyor activates when the programmable controller determines that the molten sulfur temperature in the melting and settling tank 4a is satisfactory for purification.

More specifically, a temperature probe 9a, laying in the molten sulfur in the melting and settling tank 4a, relays the temperature of the sulfur to the programmable controller. The controller uses the temperature data to control the speed in which the conveyor 3 transfers the solid sulfur to the melting and settling tank 4a. For example, when the temperature of the molten sulfur increases, the rate in which the conveyor 3 transfers solid sulfur to the melting tank 4a increases. Furthermore, as the temperature of the molten sulfur decreases, the rate that the conveyor 3 transfers the sulfur decreases. By increasing and decreasing the transfer rate of the solid sulfur according to the temperature of the molten sulfur in the melting tank 4a, the system obtains and maintains optimal melting rates and temperature for melting the solid sulfur and maintaining molten sulfur.

In preferred embodiments, the melting and settling tank 4a heats sulfur that enters it. Surrounding the tank, the system comprises steam traced heating elements (i.e. plate coils) that provides heat to the tank. In figure one, a steam line 32a supplies steam to the plate coils.

As shown in FIG. 1, within close proximity to the tank is a vapor collection and exhaust hood and a fan 8a. The hood and fan collects and removes vapors and fumes from the areas attended by operators, and dilutes and disperses said vapors and fumes with an exhaust fan. The heat needed to melt the solid sulfur is provided by the heat exchanger. The steam jacketing and plate coils maintain the temperature of the sulfur so that the sulfur maintains a molten state.

As shown in FIG. 1, the melting tank 4a contains a coarse stainless steel filter basket 5. The basket prevents foreign contaminants from entering the settling compartment 6a of the melting and settling tank 4a. In preferred embodiments of the system, the filter basket 5 is removable allowing for convenient disposal of accumulated contaminants. The disposal may be automated by use of a mechanical drive unit 7 attached to the basket 5. In preferred embodiments of the system, the mechanical drive may be driven by a hydraulic pump.

In preferred embodiments of the system, as shown in FIG. 1, a weir and skimmer plate arrangement 10a in the first melting tank 4a separates the melting and settling compartment 6a from the pump compartment 11a. The weir holds back settling contaminates while the skimmer plate prevents floating material from passing through the system, which reduces contaminants from entering the pump compartment 11a of the tank 4a. Moreover, the second tank 4b may comprise a settling compartment 6b, a fume/vapor collection hood and exhaust fan 8b, a weir and skimmer plate 10b, a pump compartment 11b, sulfur level probe 12b, sludge extraction conveyor 14b, sludge extraction motor 15b, and a molten sulfur pump 16b.

In preferred embodiments of the system, the programmable controller controls the level of molten sulfur in the first and second tank 4a & 4b. A sulfur level probe 12b monitors the level of the sulfur in the second tank 4b, which simultaneously controls the molten sulfur level in the first tank 4a via interconnecting piping 25 & 35. A variable frequency drive controls the speed of the second pump 16b, which maintains the molten sulfur level (preset in the programmable logic controller) by pumping the sulfur through the sulfur line 36 to the sulfur filters 21a, 21b, 22a, & 22b.

In preferred embodiments of the system, the first and second tank 4a & 4b are set at the same elevation and connected via jacketed piping. As sulfur melts in the first tank 4a, increasing the sulfur level, the increasing level of sulfur creates a flow of sulfur to the second tank 4b. In addition, the second pump 16b in conjunction with the level probe 12b and the programmable logic controller controls the flow of sulfur out of the second tank 4b and to the filters 21a, 21b, 22a, & 22b. The controller also controls the pumping of sulfur to feed rate.

Both tanks 4a & 4b include a drainage valve 18a & 18b, and an interconnecting line 25 that allows sulfur to flow between tanks 4a & 4b. Molten sulfur pump 16b can simultaneously pump sulfur from the tanks 4a & 4b to empty the system.

In preferred embodiments of the system, drainage valve 18c can be opened to equalize the levels of sulfur between the tanks 4a & 4b and the heat exchanger 17a during filling or emptying of the tanks 4a & 4b.

In preferred embodiments of the system, as shown in figure one, the system comprises a sludge extraction conveyor 14a.

In preferred embodiments of the system, the sludge extraction conveyor 14a & 14b comprises a flow rate of approximately two thousand nine hundred and fifty-five kilograms per hour (2,955 kg/h). The flow rate previously stated is the design capacity. The actual anticipated flow rate is one thousand two hundred and eighty-seven kilograms per hour (1,287 kg/h). The angle of the conveyors 14a & 14b is approximately twenty degrees; the length of the conveyors 14a & 14b is approximately eight meters (8 m); and overall the conveyors 14a & 14b are made up of stainless steel (i.e. SS304L).

In preferred embodiments of the system, the sludge extraction conveyor is jacketed. The housing of the sludge extraction conveyor 14a may be constructed of a steam-jacketed pipe. The carrying flights of the conveyor 14a may be made of stainless steel.

In preferred embodiments of the system, the sludge extraction motor 15a that drives the conveyor 14a is continuously running while the melting process is operating. As the collected contaminants are conveyed above the molten sulfur in the melting and settling tank 4a, a portion of the entrained molten sulfur will seep from the molten sludge and drain back into the system via the jacked housing of the conveyor, which reduces the sulfur concentration of the contaminant waste and conserves sulfur.

In preferred embodiments of the system, the sludge extraction conveyor 14a continuously removes contaminates from the tank 4a as the contaminants settle to the bottom of the tank 4a.

In preferred embodiments of the system, the bottom of the melting and settling tank comprises a contoured surface that catches the settling contaminants. As shown in FIG. 1, the system comprises a molten sulfur pump 16a.

In preferred embodiments of the system, the molten sulfur pump comprises: a flow rate of approximately two hundred and fifty-five thousand two hundred and seven kilograms per hour (255,207 kg/h); a discharge pressure of three hundred and eighty kilopascals (gauge) (380 kPa g); a density of one thousand eight hundred and one kilograms per cubic meter (1,801 kg/m 3); a power of thirty-seven kilowatts (37 kW); and an overall composition of carbon or stainless steel (i.e. SS304L), or a combination of carbon and stainless steel. The molten sulfur pump 16a provides pressure that pumps molten sulfur through a molten sulfur heat exchanger 17a, and returns the sulfur to the first tank 4a. In preferred embodiments of the system, the molten sulfur pump 16a operates continuously while the system is operating.

As shown in FIG. 2, the system comprises a molten sulfur heat exchanger 17a. In preferred embodiments of the system, the heat exchanger 17a comprises a shell 17b and a heating coil 17c within the shell 17b. The heating coil may be a bank of plate coils, or coiled pipes. The shell comprises a flow rate of two hundred and fifty-five thousand two hundred and seven kilograms per hour (255,207 kg/h); a temperature range of approximately one hundred and twenty-five to one hundred and fifty degrees Celsius; and an overall composition of carbon or stainless steel (i.e. SS304L), or a combination of carbon and stainless steel. The heating coil comprises a flow rate of three thousand two hundred and fifty-three kilograms per hour (3,253 kg/h); a temperature range of approximately one hundred and seventy-four to one hundred and seventy-five degrees Celsius; a duty or power of one thousand nine hundred and seventy and four-tenths kilowatts (1970.4 kW); and an overall composition of stainless steel (i.e. SS304L).

In preferred embodiments of the system, the heat exchanger 17a heats molten sulfur to approximately one hundred and fifty degrees Celsius. Heated molten sulfur returns to the first tank 4a from the heat exchanger 17a, as shown in figures one and two, through the filter basket 5 (see figure one). A heat probe 9b relays the temperature of the sulfur to the programmable controller, which uses the temperature data to control the position of pneumatic control valve 20b to increase or decrease the steam flow to the heat exchanger 17a.

In addition to the heat exchanger 17a, other mechanisms may maintain the heat inputted into the circulating molten sulfur of the system. If the system uses other mechanisms of heating, the programmable controller controls the additional heating mechanism. Furthermore, in preferred embodiments of the system, a heat probe 9b may monitor the temperature of the sulfur leaving the heat exchanger 17a or other temperature regulating mechanisms. In addition, the system comprises pressure transmitters 13a & 13b that monitor differential pressure of the molten sulfur across the heat exchanger and a pressure gauge 34. The pressure gauge 34 reads the pressure of tracing steam to the tank heating plates.

As shown in FIG. 2, the system comprises molten sulfur filters 21a, 21b, 22a, & 22b. In preferred embodiments of the system, molten sulfur filters include coarse (i.e. primary) and fine (i.e. secondary) sulfur filters.

In preferred embodiments of the system, the primary sulfur filter comprises a flow rate of approximately twenty-six thousand and fifty-seven kilograms per hour (26,057 kg/h); a density of approximately one thousand eight hundred and one kilograms per cubic meter (1,801 kg/m 3); a pressure drop of approximately seventy-five kilopascals (gauge) (75 kPa g); a filter size of approximately fifty micrometers (50 um); and an overall composition of carbon, stainless steel (i.e. SS304L), or a combination of carbon and stainless steel.

In preferred embodiments of the system, the secondary sulfur filter comprises a flow rate of approximately twenty-six thousand and fifty-seven kilograms per hour (26,057 kg/h); a density of approximately one thousand eight hundred and one kilograms per cubic meter (1,801 kg/m 3); a pressure drop of approximately seventy-five kilopascals (gauge) (75 kPa g); a filter size of approximately five micrometers (5 um); and an overall composition of carbon, stainless steel (i.e. SS304L), or a combination of carbon and stainless steal. Furthermore the secondary sulfur filters comprise cloth for further filtering of the sulfur.

In preferred embodiments of the system, the molten sulfur pump 16b provides pressure that pumps molten sulfur through the primary sulfur filters 21a & 21b and then through the secondary sulfur filters 22a & 22b. After filtering, the sulfur flows to a molten sulfur storage tank 24. Flow measuring element 19a measures the flow rate and accumulated flow of the sulfur after the filtering of the sulfur. In addition, the measuring element 19a may measure flow rate of sulfur exiting the system.

In preferred embodiments of the system, manually operated valves 23a-23o surround each filter in order to control the sulfur flow to a filter or set of filters. On a side note, one primary filter and one secondary filter is sufficient for preferred filtering of molten sulfur and preferred operation of the system.

In preferred embodiments of the system, manually or automatically operated valves 23a-23o allow for back flushing of filtered sulfur when a predetermined back pressure across the primary filter is reached. The back pressure is measured by pressure measuring element 19b. The back flushed sulfur is pumped back into the settling compartment 6a of the melting tank 4a via steam jacketed sulfur pipeline 39.

In preferred embodiments of the system, the manual or automatic valves may be operated while the system is operating.

In preferred embodiments of the system, an internal element of the molten sulfur filters comprises stainless steel wedge wire.

In other embodiments of the system, the primary wedge wire filter may not have openings greater than five one hundredth millimeters (0.05 mm) in diameter. Furthermore, in preferred embodiments of the system, the secondary molten sulfur filters will have cloth material covering the wedge wire portion of the filter. The cloth material covering acts as a polishing filter.

In several embodiments of the system, a second melting and settling tank 4b is removable. The second settling tank 4b disconnects from the primary settling tank 4a by blinding the flanges of the primary tank to the primary jacketed sulfur line 35 or 25.

In preferred embodiments of the system, the level probe 12a, the programmable logic controller (which measures the sulfur level in the first tank 4a), and valves 38a & 38b work together to divert a portion of the sulfur flow produced by the first sulfur pump 16a. The previously mentioned elements divert the sulfur flow to sulfur line 31 and sulfur line 36, to the filters 21a, 21b, 22a, & 22b, and eventually to a molten sulfur storage tank 24. The previously mention diversion helps maintain a consistent level of sulfur in the first tank 4a.

In FIG. 2, the two flow control valves 38a & 38b are within proximity to the heat exchanger, and one of the valves 38b is on an interconnecting line between the line 31 and the line to the sulfur filters. The two valves 38a & 38b will act simultaneously to ensure enough of the sulfur is diverted to the filters in order to maintain a consistent sulfur level.

In preferred embodiments of the system, sulfur may overflow through line 35 from the first tank 4a to the second tank 4b, as sulfur levels increase in the first tank 4a.

In preferred embodiments of the system, parts are skid mounted, allowing for easy transport of the system.

In preferred embodiments of the system, the system has a twenty-five ton per hour production capacity. Furthermore, the system is versatile and compact.

We claim:

1. A sulfur contaminant removal method comprising the steps of:
    heating a processing tank with a fluid, wherein said processing tank includes a first compartment and a second compartment;
    transporting a contaminated sulfur mixture from a storage bin to the first compartment at a certain speed;
    removing a sludge from the contaminated sulfur mixture in the first compartment to create a first sulfur mixture;
    moving the first sulfur mixture to the second compartment;
    determining a temperature of the first sulfur mixture in the second compartment;
    changing the certain speed according to the temperature;
    filtering the first sulfur mixture to create a second sulfur mixture; and
    transporting the second sulfur mixture to a storage tank.

2. The method of claim 1, wherein the fluid is steam.

3. The method of claim 1, wherein the contaminated sulfur is contaminated sulfur in a solid state.

4. The method of claim 1, wherein the contaminated sulfur is contaminated sulfur in a molten state.

5. The method of claim 1, wherein the first compartment is a melting and settling compartment.

6. The method of claim 5, where the second compartment is a pump compartment.

7. The method of claim 1, further comprising the step of moving the first sulfur to a second processing tank.

8. The method of claim 7, wherein the second processing tank has a third compartment and a forth compartment.

9. A sulfur contaminant removal method comprising the steps of:
   heating a processing tank with a fluid, wherein said processing tank includes a first compartment and a second compartment;
   transporting a contaminated sulfur mixture from a storage bin to the first compartment at a certain speed;
   processing the contaminated sulfur mixture in the first compartment to create a first sulfur mixture;
   moving the first sulfur mixture to the second compartment;
   determining a temperature of the first sulfur mixture in the second compartment;
   changing the certain speed according to the temperature;
   filtering the first sulfur mixture to create a second sulfur mixture; and
   transporting the second sulfur mixture to a storage tank.

10. The method of claim 9, wherein the fluid is steam.

11. The method of claim 9, wherein the contaminated sulfur is contaminated sulfur in a solid state.

12. The method of claim 9, wherein the contaminated sulfur is contaminated sulfur in a molten state.

13. The method of claim 9, wherein the first compartment is a melting and settling compartment.

14. The method of claim 13, where the second compartment is a pump compartment.

15. The method of claim 9, further comprising the step of moving the first sulfur to a second processing tank.

16. The method of claim 15, wherein the second processing tank has a third compartment and a forth compartment.

* * * * *